United States Patent [19]
Hadtke

[11] 3,978,725
[45] Sept. 7, 1976

[54] SPEEDOMETER PARTICULARLY FOR WATER SKIS

[75] Inventor: Frederick Borden Hadtke, New Providence, N.J.

[73] Assignee: Robert Hain Associates, Inc., Scotch Plains, N.J.

[22] Filed: Jan. 7, 1976

[21] Appl. No.: 647,423

[52] U.S. Cl. .............................. 73/182; 9/310 A; 73/493
[51] Int. Cl.² ........................................ G01P 5/16
[58] Field of Search ............... 73/182, 205 R, 212, 73/493; 9/310 A, 310 C

[56] References Cited
UNITED STATES PATENTS

| | | | |
|---|---|---|---|
| 1,885,933 | 11/1932 | Masters | 73/182 |
| 2,105,311 | 1/1938 | Clason | 73/182 |
| 3,505,878 | 4/1970 | Moll | 73/493 X |

FOREIGN PATENTS OR APPLICATIONS

| | | | |
|---|---|---|---|
| 998,460 | 9/1951 | France | 73/182 |

*Primary Examiner*—James J. Gill
*Attorney, Agent, or Firm*—Ralph R. Roberts

[57] ABSTRACT

A speed indicating device or gauge is mounted on the forward flat upper surface of the water ski. This indicator is so mounted that the user of the ski during water skiing may view this speed indicating device. The indication is achieved by a pitot tube-like device in which one end of the tube is connected to the meter and the other end is disposed on the ski underside and at the rear thereof. The tube is filled with liquid to a point near the rear of the tube where a flexible diaphragm seals the tube. The diaphragm is actuated by the pressure of the fluid flow created by the rate of travel of the ski in the water.

14 Claims, 18 Drawing Figures

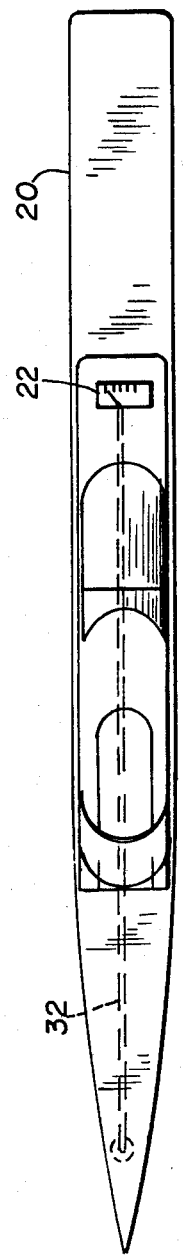
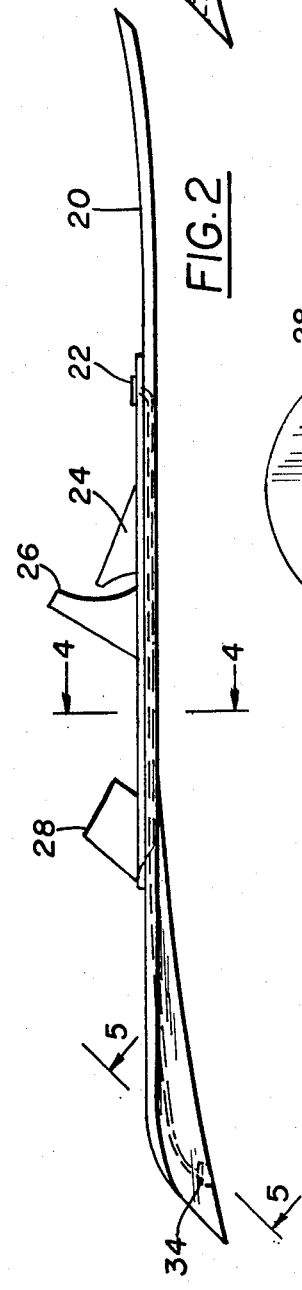
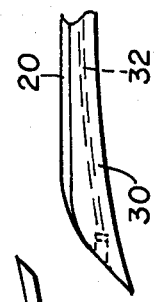
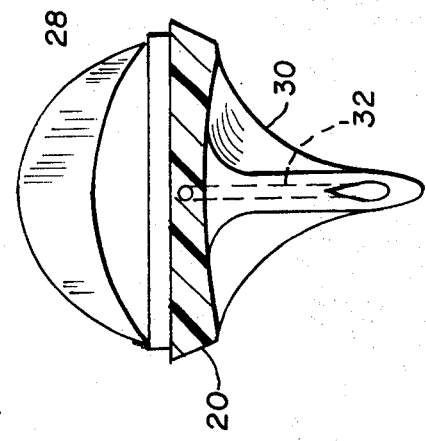
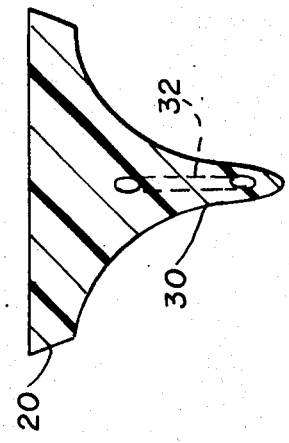
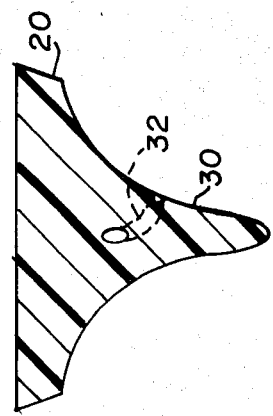

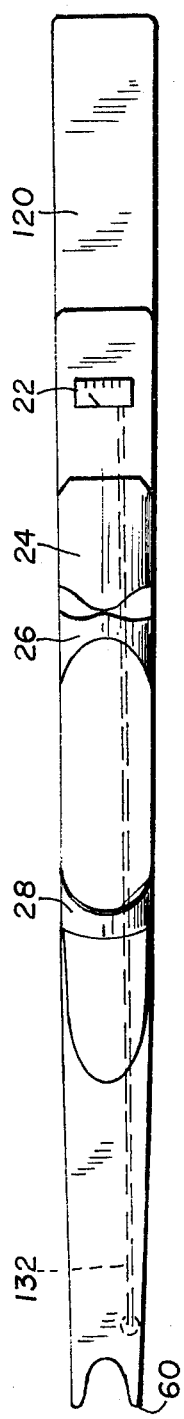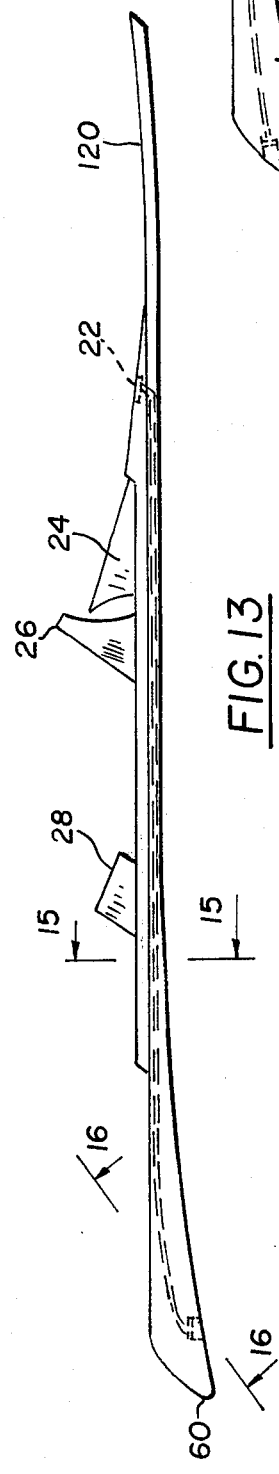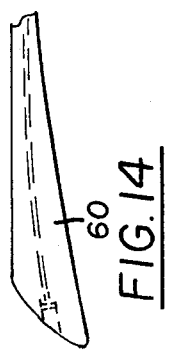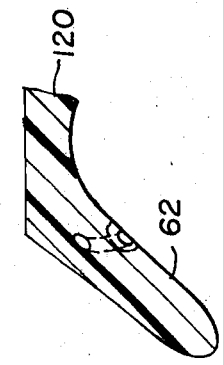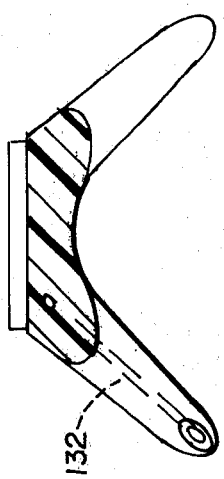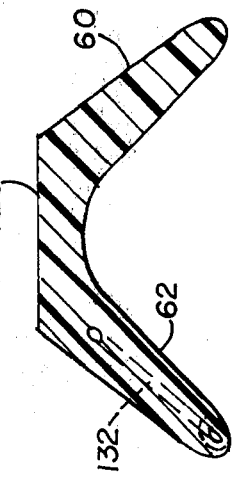

SPEEDOMETER PARTICULARLY FOR WATER SKIS

BACKGROUND OF THE INVENTION

1. Field of the Invention

With reference to the classification of art as established in the United States Patent and Trademark Office the present invention is found in the general Class entitled, "Measuring and Testing" (Class 73) and more particularly in the subclass entitled, "volume or rate of flow-pitot tube" (subclass 212).

2. Description of the Prior Art

Water skis are well known and the popularity of the sport has made their use quite extensive. Many examples of these skis may be found in the general Class 9 and the subclass 310. However, in this classification of art, and insofar as is known, there has been no attempt to provide skis with a speed indicating device.

Water skis are well known and their popularity has increased to the extent that several hundred thousand are in use and waterskiing has become a popular participant sport. In order to perform acrobatic stunts or athletic exercises successfully on the skis it is often necessary to ascertain how fast one is travelling. If the boat providing the tow has no speed indicator this is a guess. In order to provide a speed indicating device there is carried in the present skis a pitot-type tube indicator device. A portion of this pitot-type tube is preferably carried in a downwardly extending rib. This rib is either a single rib or one of a dual rib configuration. These ribs increase the control of the ski and also allow the tube to be contained therein. The end of this tube is open to the flow of water. Insofar as is known, speed indicating devices generally applied to watercraft and the like have been propeller-type devices which extend below or outwards from the hull of the craft. Since water-skiing often times requires the person to slide onto shore or off ramps and the like, protrusions containing speed indicating apparatus obviously would not be satisfactory and also would be potential hazards to swimmers and the like.

In the present invention the indicating scale portion of the gauge device is placed on the forward and top of the ski. This gauge is operatively connected to pitot-type tube apparatus and is open on the rear side or extreme rear of a depending rib of the ski. This rib may be a single rib or one of a twin rib construction to be hereinafter more fully described. The indicating device may be a pivoted, needle-type indicator moved by pressure differential developed in the tube against a bias force provided in the gauge or it may be a water column gauge into a closed end tube. The pitot-type tube rear end is open to the water flow and has a diaphragm closure by which means the fluid in the pitot-type tube is maintained during the time that the ski is removed from the water. The means for removably retaining a diaphragm at the end of the tube are shown in the following embodiments, to be hereinafter more fully described, but many other means or methods of retaining or removably retaining a diaphragm closure of the pitot-type tube may be provided.

SUMMARY OF THE INVENTION

This invention may be summarized at least in part with reference to its objects.

It is an object of this invention to provide, and it does provide, a speed indicating device for water skis whereby a gauge device is mounted on the top surface of one of the skis, which device is connected by a pitot-type tube to the rear of the ski. In a depending extending rib portion of the ski the rear end of the pitot-type tube is open to the influence of the flow of water through which the ski travels. A fluid in the pitottype tube is retained by a flexible diaphragm.

It is a further object of this invention to provide, and it does provide, an indicating device whereby the speed of the water ski may be readily observed by the user of the ski by glancing down at the forward portion of the ski wherein a pitot-type tube device is operatively connected to a guage which indicates the speed at which the ski is travelling through the water.

The present invention includes a water ski having one or two depending ribs at the underside and rear formed in the ski as a molded portion thereof. In one of these ribs and to the rear of the ski is an opening to a pitot-type tube conductor which is connected to a pressure responsive gauge which is mounted on the front top surface of the ski. This gauge is available for reading by the user of the ski during the travel of the ski in and through the water. The pitot-type tube is closed intermediate its ends by means of a flexible diaphragm so that fluid or gas trapped in the pitot-type tube by which the connected gauge is actuated is not lost during the time the ski is not in use. The diaphragm closes the pitot-type tube, the balance of which is open to the rear or bottom of the ski. The flow of water into this pitot-type tube opening during the advancement of the ski in the water causes the diaphragm to be actuated to cause a movement of the gauge indicator on the appropriate scale to be made. This reading is commensurate with the speed the ski is travelling through the water.

Two embodiments of skis are shown, one in which there is a single depending rib and the other in which there are two depending ribs. With the two depending ribs the pitot-type tube is carried in only one of the ribs. Conventionally and as a matter of economy in design and improvement of the skis themselves, it is contemplated that the skis shown in the present invention be molded of plastic usually in combination with fibers such as glass to increase the strength of the ski.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen specific embodiments of the water skis as adopted for the usual use and showing a preferred means for positioning the speed indicator and the associated tube apparatus. These specific embodiments have been chosen for the purposes of illustration and description as shown in the accompanying drawings wherein:

BRIEF DESCRIPTION OF THE DRAWINGS

FIG. 1 represents a plan view, partially diagrammatic, of a water ski and showing a proposed speed indicator gauge mounted on the upper surface of the ski;

FIG. 2 represents a side view of the ski of FIG. 1 and showing a proposed placement of the gauge and the disposition of the connected fluid conductor by which the gauge is actuated;

FIG. 3 represents a fragmentary side view of the ski of FIG. 1 and FIG. 2 but with the rear of the conductor open to the rear of the lower rib of the ski;

FIG. 4 represents a sectional view in enlarged scale and showing a proposed construction of the ski, this view taken on the line 4—4 of FIG. 2 and looking in the direction of the arrows;

FIG. 5 represents a sectional view in enlarged scale, this view taken on the line 5—5 of FIG. 2 and looking in the direction of the arrows;

FIG. 6 represents a sectional view as in FIG. 5 but with the conductor opening placed at the side of the depending rib;

FIG. 12 represents a plan view of a ski such as depicted in FIG. 1 but with twin ribs on the bottom side of the ski;

FIG. 13 represents a side view of the ski of FIG. 12 and showing the proposed placement of the gauge and the connected fluid conductor being disposed in one of the twin ribs;

FIG. 14 represents a fragmentary side view of the ski of FIGS. 12 and 13 but with the rear of the conductor open to the rear of one of the twin ribs.

FIG. 15 represents a sectional view in enlarged scale and showing a proposed construction of the ski, this view taken on the line 15—15 of FIG. 13 and looking in the direction of the arrows;

FIG. 16 represents a sectional view in enlarged scale, this view taken on the line 16—16 of FIG. 13 and looking in the direction of the arrows, and FIG. 17 represents a sectional view as in FIG. 16 but with the conductor opening placed at the side of one of the depending ribs.

In the following description and in the claims various details will be identified by specific names for convenience. The names, however, are intended to be generic in their application. Corresponding reference characters refer to like member throughout the several figures of the drawings.

Figure 7:
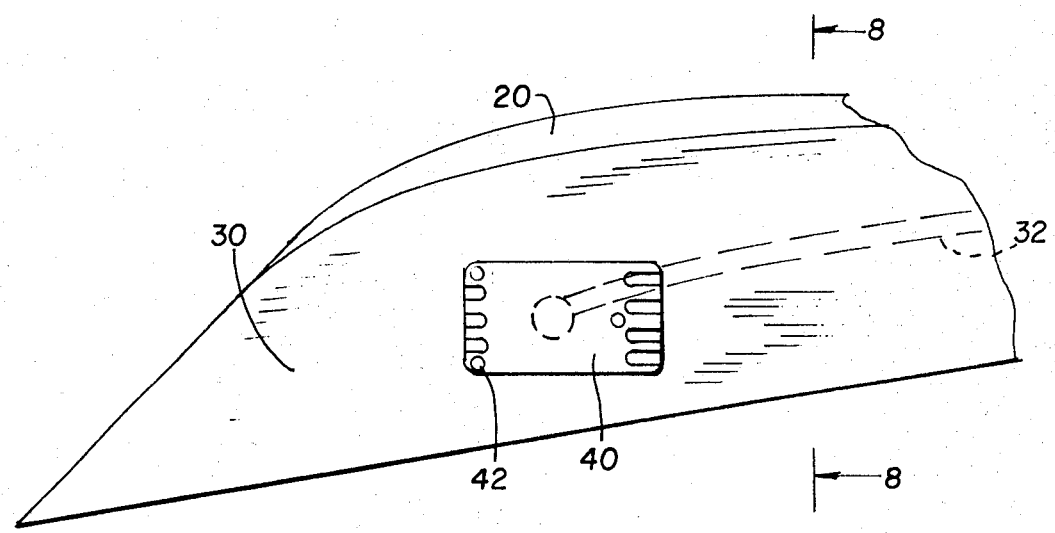
FIG. 7 represents a side view, in enlarged scale of the rear or terminal end of the fluid conductor and incorporating a protector plate arranged to permit the water to flow under the plate and into actuating contact with the diaphragm during advancement of the ski in the water.

The drawings accompanying, and forming part of, this specification disclose certain details of construction but it should be understood that structural details may be modified in various respects and that the invention may be incorporated in other structural forms than shown.

DESCRIPTION OF THE PREFERRED EMBODIMENT OF FIGS. 1,2,4 and 5

Referring now to the drawings and in particular to the embodiment shown in FIGS. 1, 2, 4 and 5, there is depicted a ski body 20 which preferably is molded of reinforced plastic such as fibreglass. This ski body member is illustrated as having a more-or-less blunt or square front end but this is merely a matter of selection. Carried on the upper portion of this ski is a gauge indicator 22 which may include a pivoted needle or may be a fluid in a tube passing along side of an indicia scale. This gauge no matter the arrangement is actuated by a pressure differential in the tubular conductor. To the rear of this gauge 22 is shown a toe retainer 24 and front foot retaining strap 26. To the rear of these conventional members is a heel retaining cup 28. In the embodiment of FIGS. 1,2, 4 and 5 there is shown a depending rib which extends from the bottom plane of the ski and begins at about the toe retaining portion 24 of the ski and then preferably with a slight arc curves downwardly to its maximum extent at about the tail or rear end of the ski. This downward rib is identified as 30.

Carried in this rib and in the body of the ski is a small conductor tube 32, this tube is operatively connected at its forward portion to the gauge 22 and near its rearward end portion is closed by means of a diaphragm 34. This diaphram is shown in greater detail in FIGS. 9A and 9B and is hereinafter more fully described. It is sufficient to state that the diaphragm is flexible and closes off a fluid medium which is in the pitot-type tube. As the diaphragm is pushed forward or drawn backward by the movement of the ski travelling through the water it causes a corresponding movement of the needle portion or indicative portion of the gauge 22. As seen in FIG. 2, the rear portion of the tube 32 extending beyond the diaphragm is open to the bottom of the rib 30.

Alternate Construction of FIG. 3

As seen in FIG. 3, the downwardly depending rib 30 in the embodiment is similar to the rib shown in FIG. 2 but instead of the tube 32 extending to the bottom of the rib the tube is open at and to the rear of the rib in this particular embodiment.

Embodiment of FIG. 6

In FIG. 6 is shown a small change in the construction of the tube 32 as shown in FIG. 2. Instead of the tube extending to the bottom of the rib, the tube 32 opens to the side of the rib 30. The placement of the rear outlet of the tube is merely a matter of selection and the calibration of the indicia of the gauge 22 is merely a matter of correlation of the arrangement of the tube and the guage.

Figure 8:
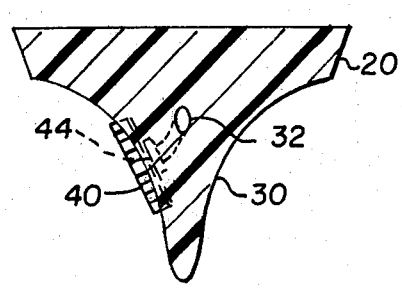
FIG. 8 represents a sectional view taken on the line 8-8 of FIG. 7 and looking in the direction of the arrows.

Embodiment of FIGS. 7 and 8

In the embodiment of FIGS. 7 and 8 instead of the rear tube opening directly to the outer portion of the rib, this embodiment shows in FIGS. 7 and 8 an additionally provided guard in the form of a protector plate 40 having fluid guideways formed in the forward and rear portions thereof. This plate is retained by means of screws 42 onto the side of the rib 30. The end of the tube 32 is covered by a diaphragm 44. The diaphragm is actuated by the flow of water as it passes underneath the plate 40 as and when the ski is advanced forwardly in the water.

Figure 9A:
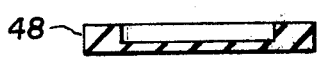
FIGS. 9A and 9B represent sectional side views of proposed rubber diaphragm constructions by which the rear of the fluid conductor is closed.
Figure 9B:
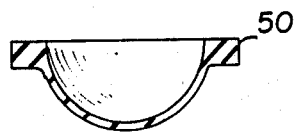

Embodiments of FIGS. 9A and 9B

Referring next to FIGS. 9A and 9B it is to be noted that two embodiments of substantially alike diaphragms are shown. In FIG. 9A a rubber diaphragm identified as 48 has a bulge formed on the thinner center portion. This center bulged portion is surrounded and retained by a heavier molded rim or ring. In FIG. 9B instead of the curved center portion, a diaphragm 50 has a thinner center portion which is retained in place by an outer rim ring of material.

Figure 11:
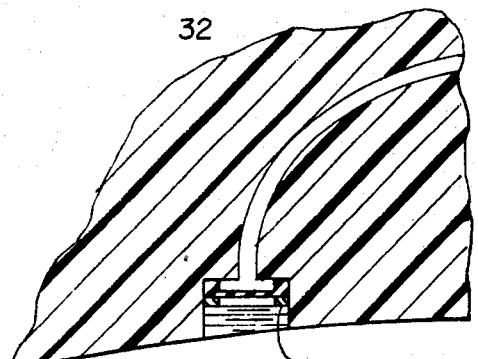
FIG. 11 represents a side view, partly fragmentary, of the diaphragm installation of FIG. 10.
Figure 10:
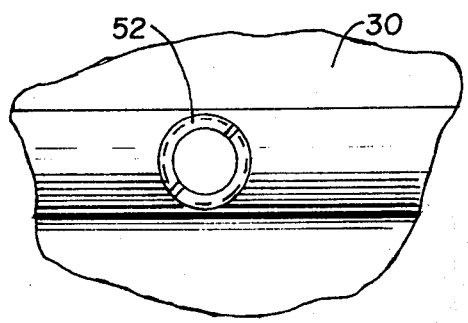
FIG. 10 represents a sectional end view showing a typical installation of the diaphragm in the fluid conductor.

Embodiment of FIGS. 10 and 11

As shown in FIGS. 10 and 11 is a typical installation of a diaphragm. Since it is contemplated that replacement of the diaphragm may be necessary or that the fluid in the tube 32 may have to be replaced on occasion, the diaphragm of either FIGS. 9A or 9B, identified as 48 or 50, may be held in place by a formed counterbore located at the terminal end of the conductor tube 32. This counterbore is sized to accept the outer rim of the diaphragm 48 or 50. A hollow nut 52 is carried by appropriate threads formed in the counterbore in the ski. Shown in FIG. 11 is a fluid 54 which fills the conductor passageway tube 32 and is added after the ski is assembled and prior to the diaphragm being placed and removably secured in the counterbore.

Embodiment of FIGS. 12, 13, 15 and 16

Referring next to the drawings and to FIGS. 12, 13, 15 and 16, it is to be noted that a ski body 120 carries on its upper surface a gauge 22, as in FIG. 1. Also shown are the toe protector 24, the front strap 26 and the heel cup 28. Instead of a single rib as in FIG. 1, this ski body has two ribs which extend downwardly and outwardly to form approximately a 90° angle between them. These ribs are identified as 60 and 62 in FIGS. 12, 13, 15 and 16. A conductor tube 132 similar to tube 32 is carried in the body 120 and also in the rib 62. As shown in FIGS. 13 and 16, the tube end terminates at the downward surface and is directed slightly forwardly. The tubing 132 terminates with a diaphragm and a hollow nut 52, as seen in FIGS. 10 and 11.

Embodiment of FIG. 14

As seen in FIG. 14, the tube 132 instead of terminating forwardly and at the bottom of one of the lower ribs has the conductor extending to the rear of the rib, as in FIG. 3.

Embodiment of FIG. 17

Referring finally to FIG. 17, it is to be noted that instead of the terminal end of the conductor being at the bottom of the rib, the conductor is terminated on an inner flank surface of the rib 62, as seen in FIG. 17.

Use and Operation

Whether the skis have a single or dual depending ribs it is anticipated that the rib construction will provide better guide and control means for water skis than the present flat skis constructed from wood or laminates thereof. The technique of molding the skis permits ribs to be easily formed and in these ribs and in the ski body associated therewith fluid conductors in the form of tubes may be easily provided. This tubular conductor may be a plastic tubing layer in place prior to curing the plastic or may be molded when skis are made as a laminate. In any manner of construction the conductor is operatively connected at its forward end to a pressure gauge 22 which may be a pivoted, needle-type gauge in which a curved tube is moved by the increase in pressure or it may be fluid in a tube in association with a linear-type scale in the manner of a clinical thermometer in which colored fluid is caused to move in the tube along an indicia scale. In any arrangement of the gauge 22, no matter how constructed, it is anticipated that an increase or decrease in pressure of the fluid in the conductor 32 or 132 will be directly read on the gauge 22. The rear of the conductor tube is directly covered by a protective plate and is indirectly open to the water and a diaphragm closes the end of this tube to retain the determined amount of fluid in the conductor. As the ski is pulled through the water, the flow of water across or to the end of the tube causes the diaphragm to be moved to move the captured fluid in the conductor to cause the gauge 22 to indicate the speed of this ski as it travels through the water.

Terms such as "up", "down", "bottom", "top", "front", "back", "in", "out" and the like are applicable to the embodiments shown and described in conjunction with the drawings. These terms are merely for the purposes of description and do not necessarily apply to the position in which the water skis of the speed indicating apparatus may be constructed or use.

While particular embodiments of the water skis and the tubular conductor have been shown and described it is to be understood the invention is not limited thereto since modifications may be made within the scope of the accompanying claims and protection is sought to the broadest extent the prior art allows.

What is claimed is:

1. A speed indicating apparatus particularly for water skis, said indicator apparatus including: (a) a ski body; (b) a pressure responsive gauge carried on and by the ski body and having indicia and a viewing face so positioned as to be readily visible to the user of the skis and also when the skis are advanced in normal use in the water; (c) a tubular conductor provided in the ski body and having its forward end operatively connected to the pressure responsive gauge and its rear or other end disposed on the underside and toward the trailing end of the ski as used; (d) a flexible diaphragm carried by the ski and disposed so as to close the tubular conductor at a point near its rear opening to the water, and (e) a fluid means filling that portion of the tubular conductor between the operative connection to the pressure responsive gauge and the diaphragm, and in response to the movement of the diaphragm as effected by the rush of water by the rear opening of the tubular conductor the diaphragm and the fluid in the sealed conductor is moved so as to actuate the gauge to provide an indication thereon of the rate of travel of the ski through the water.

2. A speed indicating apparatus as in claim 1 in which the ski is at least in part molded of plastic and has at least one rib portion depending from the rear and bottom portion of the ski, the tubular conductor end particularly the rear end opening thereof carried at least in part in said rib.

3. A speed indicating apparatus as in claim 2 in which the ski has one depending rib disposed substantially central of the ski and substantially normal to the general upper surface of the ski.

4. A speed indicating apparatus as in claim 3 in which the rear opening of the tubular conductor is at the bottom of the rib.

5. A speed indicating apparatus as in claim 3 in which the rear opening of the tubular conductor is at the rear of the rib.

6. A speed indicating apparatus as in claim 3 in which the rear opening of the tubular conductor is on the flank side of the rib.

7. A speed indicating apparatus as in claim 2 in which the rear opening of the tubular conductor is provided with a protective cover plate which in mounted condition is adapted to permit a flow of water under the plate and against the diaphragm adjacent thereto, the cover plate providing protection against rupture of the diaphragm by contact with debris in the water in which the ski is used.

8. A speed indicating device as in claim 1 in which the diaphragm is of rubber and has a thinner center membrane portion and a heavier rim portion and the tubular conductor outlet is formed with a counterbore in which is mounted a hollow retaining member which removably retains the diaphragm so as to close the conductive passageway.

9. A speed indicating apparatus as in claim 1 in which the ski is at least in part molded of plastic and has two rib portions depending from the rear and bottom portion of the ski, the tubular conductor and particularly the rear end opening thereof is carried in part in one of the ribs.

10. A speed indicating apparatus as in claim 9 in which the two rib portions are disposed with the planes thereat at about right angles to each other.

11. A speed indicating apparatus as in claim 9 in which the rear opening of the tubular conductor is at the bottom of the rib carrying the conductor.

12. A speed indicating apparatus as in claim 9 in which the rear opening of the tubular conductor is at the rear of the rib carrying the conductor.

13. A speed indicating apparatus as in claim 9 in which the rear opening of the tubular conductor is on the flank side of the rib carrying the conductor.

14. A speed indicating apparatus as in claim 13 in which the rear opening is additionally provided with a protective cover plate which in mounted condition is adapted to permit the flow of water under the plate and against the diaphragm adjacent thereto, this cover plate providing protection for the diaphragm against damage and accidental puncture by contact with debris in the water.

* * * * *